July 27, 1965    N. N. IDA ETAL    3,196,533
METHOD FOR FORMING HONEYCOMB MATERIALS
Filed July 10, 1963
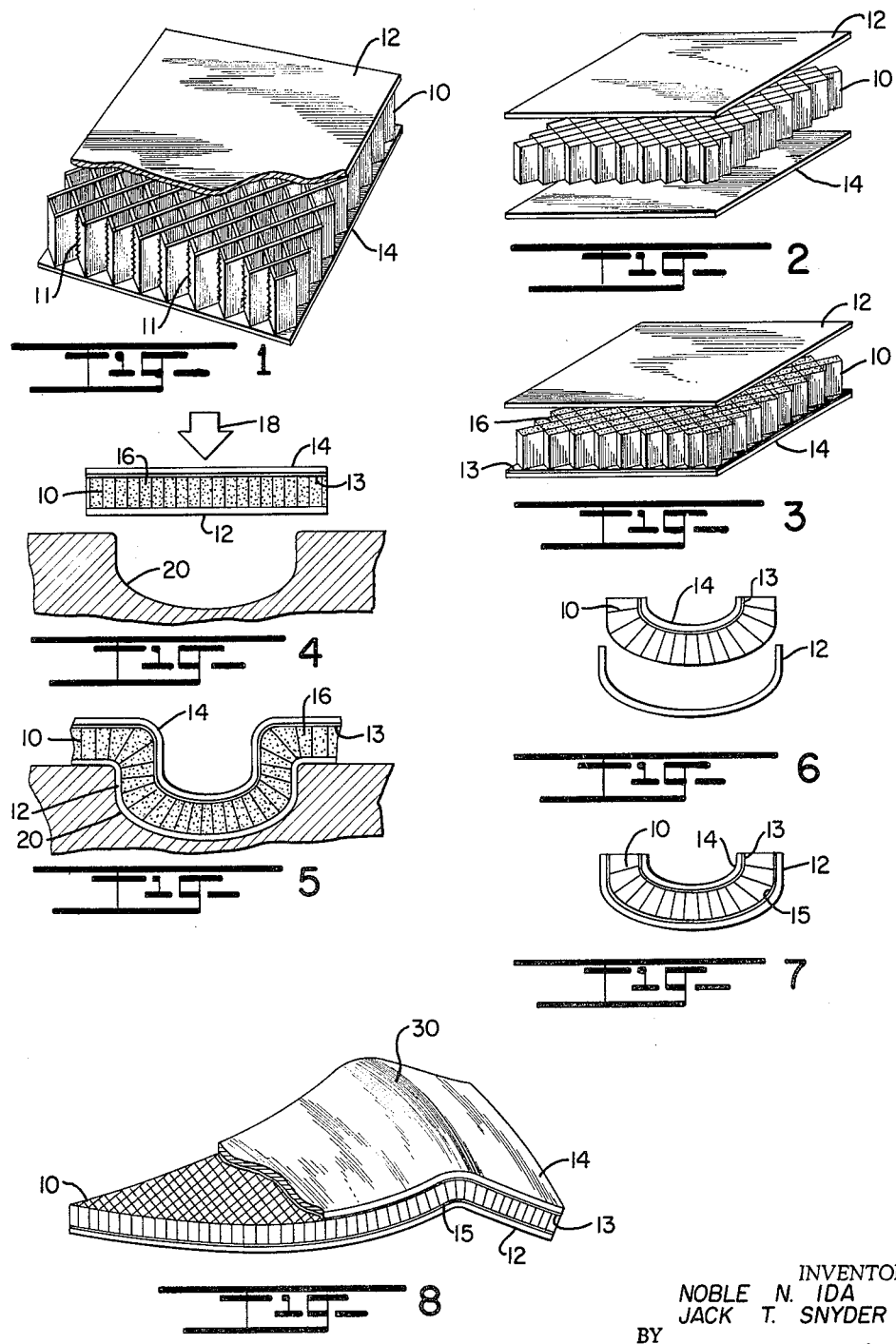
INVENTORS
NOBLE N. IDA
JACK T. SNYDER
BY
Sheridan and Ross
ATTORNEYS р
3,196,533
METHOD FOR FORMING HONEYCOMB MATERIALS
Noble N. Ida, Boulder, and Jack T. Snyder, Littleton, Colo., assignors to The Martin Marietta Corporation, Baltimore, Md., a corporation of Maryland
Filed July 10, 1963, Ser. No. 294,052
14 Claims. (Cl. 29—421)

The present invention relates to methods for forming honeycomb materials, such as, cores or sandwiches into curved forms, and more specifically to methods for the formation of compound curvatures from flat cores and/or sandwiches of honeycomb material.

It is essential to an understanding of the present invention that the structure of honeycomb materials, such as, cores and sandwiches be understood. A honeycomb core is formed from foil-thin ribbons of specially treated paper, reinforced plastic, aluminum, titanium, steel, or other like materials, such ribbons being arranged symmetrically in repetitive cell-like patterns and being supported relative to one another in a continuous bonded structure, as by adhesives or by resistance welding techniques. The patterns may be of hexagonal, square, or other cross section or the cores may be of web or truss construction. Many types of cores are well known in the art.

Honeycomb sandwiches are formed of cores (as described in the preceding paragraph) which are secured between face plates or skins. The face plates act as prime load bearing members, and by proper design, complete surface stabilization permits large compressional strengths to be realized, even with the use of very thin gage face plates or skins. The cores provides continuous support to the face plates to prevent buckling under compression, while absorbing and transmitting shear stresses along the core interfaces. Thus, honeycomb sandwich structures permit very high strength-to-weight ratios to be achieved. Furthermore, excellent stiffness, vibration damping and thermal and acoustical insulation properties can be provided over a wide range of requirements by simply changing the face plate and core materials and/or the basic design of the honeycomb core.

Honeycomb cores and sandwiches as previously described have come into substantial use in aircraft and in missile applications, and may be utilized in any situation wherein high compressive strength-to-weight ratios are desirable. However, there are difficulties in providing compound curved shapes of the basic sandwich composite because the excellent compressive load bearing attribute complicates the bending of the cores and their face plates into such shapes. Prior to the present invention there has been no feasible method for forming shells of revolution such as ellipsoids, paraboloids, hemispheres or other compound curved structures from flat cores and this limitation has prevented full utilization of the otherwise advantageous honeycomb constructions as structural members. Generally speaking, only simple curved structures have hitherto been possible and these only by difficult and expensive procedures involving contour machining and/or the joining of plural segments. The multiplicity of steps involved in these prior art procedures increased the possibility of errors of a mechanical nature.

Another disadvantage of methods utilized prior to the present invention was that it was often necessary to shape the core and the face plates separately and to subsequently join them by adhesives or by resistance welding. In such processes, the separately formed face plates and cores require very close tolerances since it is necessary to have an accurate fit and to avoid contour mismatch. Obviously, such mismatching makes it difficult to obtain a continual through surface bond between the core and the face plates and structural integrity is affected. Such difficulties are, of course, aggravated as the severity of the curve or compound curve increases. The reason is that as the face plates are progressively exposed to more drastic stretching conditions, the plates have a greater tendency to distort or wrinkle in localized areas. This wrinkling occurs as a result of local volume changes in the metal which are produced in the stretch forming operation needed to form the face plates and such wrinkling causes difficulties, for obvious reasons, in subsequent bonding operations.

Yet another disadvantage of prior methods is the fact that existing stretch presses are not large enough in capacity to stretch form large honeycomb sandwich parts, i.e. plates of diameters of 10 feet or more.

The present invention provides simple, practical, and economical techniques for the forming of honeycomb structures into curved and compound curved shapes, the techniques not requiring difficult or expensive contour machining nor the joining of plural segments. Moreover, the techniques of the present invention result in accurate interfitting of cores and face plates and provide economically feasible methods for the handling of larger sections than have hitherto been shaped in stretch presses.

These advantages over prior existing methods are accomplished by a combination of procedural steps including explosive forming, such steps having certain auxiliary advantages including work hardening (where metallic cores are involved). Such advantages will be discussed in detail hereinafter.

It is, therefore, an object of the present invention to provide improved methods for shaping honeycomb cores and/or sandwiches into curved shapes.

A further object of the present invention is to provide improved methods for shaping honeycomb cores and/or sandwiches into compound curved shapes, as for example domes or shells of revolution in the nature of surface sections of ellipsoids, hemispheres, etc.

Yet another object of the present invention is to provide improved methods for the shaping of honeycomb cores and/or sandwiches wherein the contours of the face plates are better matched to the contours of the cores whereby to insure better bonding of cores and face plates and greater structural integrity of the finished sandwich shapes.

A still further object of the present invention is to provide simple, economical and dependable methods for shaping curved structural forms of honeycomb structures, such methods permitting the formation of large curved sections with relatively less involved equipment than has been possible in the past.

Another object of the present invention is to provide improved methods for forming metallic curved and/or compound curved honeycomb constructions wherein a work-hardening of the said constructions results from the forming operation.

These and other objects and the advantages attendant thereto will become apparent from the following detailed specification, taken in conjunction with the accompanying drawings, wherein like reference numerals have been appended to like parts throughout and wherein:

FIGURE 1 is a perspective view of a typical flat honeycomb sandwich construction with a portion of the top face plate broken away, showing a honeycomb core having square cells;

FIGURE 2 is a schematic view, in perspective, showing the component parts of a honeycomb sandwich construction prior to application of the techniques of the present invention thereto;

FIGURE 3 is a view similar to FIGURE 2, showing the honeycomb sandwich parts of FIGURE 2 with the bottom face plate thereof bonded to the honeycomb core and including a partial showing of honeycomb structure filled with paraffin wax, or similar thermosetting materials;

FIGURE 4 is a schematic representation of the application of explosive forming procedures to the honeycomb sandwich components of FIGURE 3;

FIGURE 5 is a schematic representation of the honeycomb sandwich of FIGURE 4, after forming;

FIGURE 6 is a schematic representation of the formed honeycomb of FIGURE 5, after trimming and after removal of the filling material from the core;

FIGURE 7 is a view similar to FIGURE 6 showing the finished compound curved honeycomb sandwich; and FIGURE 8 is a perspective view schematically illustrating a more complex compound curved honeycomb structure formed according to the teachings of the present invention.

The basic premise of the present invention, in its broadest aspect, is that honeycomb structures, such as are described in the introductory portion of this specification, may be formed into curved and compound curved configurations by filling the honeycomb core with removable solid supporting material (such supporting material preferably of low melting point, such as paraffin wax, or similar thermosetting material) and then subjecting the structure to explosive forming followed by removal of the supporting material from the formed honeycomb object.

Attention is now directed to the drawings, wherein the various figures are illustrative of some examples of the utilization of the principles of the present invention. Thus, FIGURE 1 illustrates a typical flat honeycomb construction. Such constructions comprise a core 10 and face plates 12 and 14. In final use the plates 12 and 14 are welded or otherwise bonded to the core. A core 10, as previously discussed, comprises a plurality of cells or nodes formed by welding or otherwise joining very thin segments of material together, as indicated by reference numeral 11 in FIGURE 1. The cell formation is rectangular in this exemplary showing (the top plate 12 being broken away to show this detail) but it should be understood that the present invention is applicable equally to cell configurations of any other cross sections or may be applied to web or truss type cores well known in the art. Also, as discussed in the introductory portions of this specification, honeycomb structures, i.e. cores and face plates, may be made of wide varieties of materials and the techniques of the present invention are obviously applicable to such materials and configurations.

FIGURES 2–7 schematically illustrate one variation of the present invention. Thus, starting with standard honeycomb material comprising a honeycomb core 10 of any cell design, and unattached matching flat top and bottom face plates 12 and 14, respectively, as shown in FIGURE 2, the first step is to bond the lower face plate 14 to the core 10 by known methods appropriate to the core and face plate materials, the bond being indicated by reference numeral 13.

After bonding of the lower face plate to the core, the honeycomb cells are filled with melted paraffin or the like by use of an appropriate device, not shown. The paraffin is then allowed to set and is trimmed to the original thickness of the honeycomb core, the paraffin being indicated by the reference numeral 16, and the resultant arrangement being illustrated in FIGURE 3.

The top face plate 12 is then attached or placed in position, unbonded, adjacent the core 10 to form a paraffin filled honeycomb sandwich composite. The said composite is explosively formed by explosive forming techniques wherein a chemical explosion is utilized to create a shock wave. The shock wave forms the honeycomb structure against a shaping die.

The procedure used to form the honeycomb material by an explosive shock wave is described generally in copending application Serial No. 185,077, filed in the U.S. Patent Office on April 4, 1962 by Noble N. Ida and Jack T. Snyder.

In accordance with preferred procedure, a liquid, preferably water, is used as the medium to transmit the shock wave. The entire assembly of die, sandwich and explosive is mounted under water. In assembly, a flat composite sandwich of face plates and core, or of other assembly including honeycomb material filled with removable supporting solid material is placed over a female die cavity having the required curvature and the overlapping surfaces of the sandwich clamped to the die in a watertight manner with suitable clamping means. An explosive charge, preferably of a high order of detonation, is mounted opposite the outer plate of the sandwich at the required distance from the plate. The distance will depend on the size of the explosive and the degree of forming required, and other well known and controllable parameters. If necessary, a stabilizing plate, preferably of the same material as the face plates, is mounted between the explosive charge and the outer face plate adjacent the face plate. Two stabilizing plates may be used, one on each side of the sandwich. Obviously, if honeycomb material is being formed without face plates assembled, stabilizing plates may be necessary. The necessity of utilization of the plates in the latter instance will depend upon such parameters as the type of core material and filler material used. The thickness of stabilizing plates can be adjusted in accordance with the stabilization which is required, i.e., the degree to which the force of the shock wave must be absorbed. The explosive is detonated to initiate a shock wave to form the sandwich into the die.

Other media than water can, of course, be used; the forming can be done using air as the transmitting medium. The advantage of a contained liquid medium is that it affords better control of the shock wave energy.

The forming step is schematically indicated in FIGURE 4, wherein the arrow 18 represents the force of an explosive charge or the shock wave and the numeral 20 represents the die against which the flat honeycomb sandwich composite is forced by the shock wave to be formed to the shape of the die. In practice, as distinguished from the schematic showing, the core sandwich may be placed between two plates prior to the explosive forming step for stabilization or a single plate may be used for stabilization as explained above. The die 20 may be in the form of a simple cylindrical section or any desired compound curve, such as a dome in the form of an ellipsoid, paraboloid, or even more complex combinations, as desired. As a result of the explosive forming step, the honeycomb sandwich is formed into the shape shown in FIGURE 5, in the die 20. It should be noted that both the attached face plate 14, and the unattached face plate 12 are thus formed to very accurate agreement in contour with the core.

The formed sandwich composite is then removed from the die 20, the face plate 12 removed, and the paraffin wax 16 removed therefrom by melting, as by steam or the like. If desired, the core may be further cleaned by washing with a liquid cleaning agent, as for example, ethyl alcohol.

The parts may be trimmed to final shape, as shown in FIGURE 6, and the face plate 12 brazed or otherwise bonded to the core, the bond being indicated by the reference numeral 15 and the finished product being shown in FIGURE 7. It should be noted, that by virtue of the nature of the forming, both the plate bonded before forming and the plate bonded after forming closely conform in contour to that of the core and thus make possible bonds which insure optimum structural integrity.

Illustrative of test results achieved by the method were those obtained by explosive forming multiwave directional property honeycomb, that is, sine wave honeycomb design. The formed specimens showed no evidence of cell deformation and no elastic springback was noted. This latter phenomenon on a directional core of this type is quite unusual. The method was applied to a special type of honeycomb material, that is, phenolic glass honeycomb. Two shells of the desired curvature were formed on a 24 inch diameter free forming tool. One shell was of hexagonal cell core design and was formed to a depth of 6 inches. The other cell was a multiwave core design and was formed to a depth of 5½ inches. No deformation of cell structure was noted and the formed shells were otherwise satisfactory. Both of the shells were formed with the lower face plate bonded by an epoxy resin bonding agent. The continuity of the seam lines in the hexagonal phenolic honeycomb was an excellent indication of the bond continuity after forming. It has been found that any buckling effects which may occur at rare intervals are primarily influenced by the die-diameter to blank-thickness ratio and can readily be eliminated by use of a thicker stabilization plate.

The method was applied to the formation of core sections from honeycomb plastic material. A thin, heat resistant phenolic honeycomb core section was formed to a 2:1 ratio ellipsoid. The part, with the exception of the radius, showed excellent bond contact after the explosive forming. In another test, a core section was formed using ¾ inch thick phenolic honeycomb heat resistant plastic core with a face plate of 0.125-inch to 0.190-inch stock aluminum alloy. A core section die was used, being a 30° segment of a 43.2-inch diameter $\sqrt{2:1}$ ellipsoidal shell. Some springback in the bottom section of the part was noted; however, the bond line remained unchanged.

The method has been extensively tested for the forming of honeycomb material utilizing metallic sandwich cores. Metallic alloy sandwich cores are currently being manufactured largely in square, hexagonal, or waveform cell types, although other special core designs are in the experimental stages. None of these core configurations are designed for sandwich structures having severe two or three dimensional curvatures and they are not suited for such structure if made by conventional methods. Square cell cores having comparatively narrow node bonds can accommodate only slight bending provided the radius is ample or the core height relatively shallow. Straight cell cores are easily damaged even if slight bending is attempted.

The following tests, selected from a large number of successful test, demonstrate the feasibility of tse explosive forming method of this invention for providing curved honeycomb structures utilizing metallic core materials.

A curved structure was formed of hexagon configuration honeycomb material in which the material used is sold by Hexcel Corporation and was 0.125-inch thick, 0.125-inch cells, 0.002-inch ribbon thickness, 1100 aluminum. A 3-inch hemispherical forming die was used. Wax was used as the filler material for supporting the cell structure. Parts were formed with the lower face plate adhesively bonded and without the face plate. Virtually no change was noted in the cell dimensions and the lack of core crushing was noteworthy. The cell joints were totally undisturbed over the entire shape. Deflection was measured at 1.24 inches or more, commonly an ellipsoid of 2.4:1 ratio.

A series of tests were performed on square stress metal core design to demonstrate the feasibility of the method on an extremely rigid honeycomb design core. The material was 17–7 PH steel, 0.500-inch thick core, 0.375-inch cells, 0.005 inch thick foil. A 6-inch hemispherical forming die was used and wax was used as a filler material for supporting the core structure. The consistency and the absence of cell deformation was striking. Except at the critical die radius, which normally would be above the trim line, there was no cell crushing or distortion.

A further series of tests were performed to demonstrate the feasibility of the method in forming metal truss core design. The material used was 1100 aluminum alloy, 1.0-inch thick core, 0.312-inch cell height, 0.002-inch thick foil, 0.375-inch cell width. A 6-inch hemispherical forming die was used and wax was again used as the supporting material for the honeycomb structure. As is well-known, the directionally designed truss core retains a high degree of formability or bendability in the transverse direction of the sine wave pattern. Ductility in the perpendicular direction to the pattern is quite limited. The results showed that the truss core dimensions remained unchanged after explosive forming. There was no evidence of collapsing or crushing of the sine wave segments as a result of forming. Both the rigidity and strength of the truss core after forming was improved markedly as demonstrated by comparative bending tests of the formed shell and the original material.

The tests demonstrated conclusively that the method of the invention can be used to form curved honeycomb parts and structures from all types of honeycomb elements regardless of the size, cell structure and material of which they are made. The method is peculiarly adaptable to the forming of large curved parts for missile and rocket applications, such as, large domes for missile fuel tanks.

By procedures such as that described above, compound curved honeycomb shapes can be formed of almost infinite type and variety. Attention is directed to FIGURE 8 as an example of a more complex compound curved honeycomb sandwich section, shaped by the techniques herein described. Honeycomb structures can be formed into many practical and useful shapes. FIGURE 8 illustrates that it is an advantage of the present invention that even reverse curve or bend lines or areas, such as indicated at 30, can be achieved without wrinkling the face plates and with excellent contour matching of the face plates and the cores so that structural integrity is retained despite the complex shapes involved. This makes possible the opening of entirely new areas for structural and ornamental use of honeycomb panels.

It should be understood that the above described method is purely by way of example and it will be obvious to those skilled in the art that the present methods are applicable to forming honeycomb cores of all sizes without plates; with one plate bonded to the core and one unbonded as in the example specifically described hereinabove; or with both face plates unattached (not bonded) to the core so that they are formed into curved shapes simultaneously therewith by explosive forming according to the present invention. Also, it will be clear to those skilled in the art that the present invention is also applicable to the shaping of honeycomb sandwich structures of all sizes wherein both face plates have been previously bonded to the core, if the core is provided with through transverse channels for pouring in and melting out the filler material.

The advantages of the procedures and techniques disclosed herein are readily apparent. Thus, dome shapes and various other complex curved panels may be formed from flat honeycomb sandwich panels, without damage to the internal core structure, the filling of the core with thermo-setting or other solid material prior to the forming operation serving to provide internal support for the core cells to prevent damage thereto or change in dimensions thereof as the panel configuration is changed. In this connection it should be noted that a wide range of supporting material can be used as filler material, including solids and liquids. Preferably, non-reactive filler materials having low melting points are used. Some examples are paraffin wax, Cerrobend, or the like. Moreover, the present methods provide means for eliminating mismatch in contour between the face plates and the core since a face plate or both face plates and the core can be shaped simultaneously in either the bonded or unbonded condition.

It should also be apparent that the present invention makes it possible to achieve more complex shapes than were hitherto possible and greatly simplifies prior art procedures for reproducing such curved honeycomb sandwich panel shapes. As an added advantage, the heat and pressures developed in the present explosive forming method are such as to strengthen the foil ribbons in cases where metallic cores are involved. Such effects of heat and working of metals are well known in the metallurgical and metal-working arts.

Finally, for the shaping of large panels, the provision of a single die and a chamber for containing a chemical explosion is extremely more economical than providing massive pairs of matching dies and extremely large and powerful press machinery such as would be necessary in using press-forming techniques on large panels. Therefore, as a matter of economics, the present invention makes it possible and feasible to form curved honeycomb panels of much larger sizes than could be undertaken by prior press-forming methods.

As has been stated above, the present invention may be practiced in a wide variation of manners within the scope of this specification and is applicable to the forming of cores and face plates made of metal, paper, plastic and other materials, and upon honeycomb cores of different cell shapes and types. Moreover, various materials may be used as the filler material to fill the honeycomb core cells prior to the explosive forming step of this invention; practically any non-reactive solid material would be operative and those having a low melting point are preferable although only a few specific examples have been mentioned herein. Accordingly, it is to be understood that the scope of the invention is not intended to be limited by any specific illustrative described materials or steps, or succession of steps.

What is claimed is:

1. A method for forming a curved honeycomb sandwich from a flat honeycomb sandwich composite consisting of a flat honeycomb core and a pair of matching flat face plates; said method comprising the steps of bonding one of said face plates to one face of said core, filling the cells of said core with a melted solid compressible material, allowing said material to solidify, placing the other of the face plates against the opposite face of said core to form a honeycomb sandwich composite, positioning said composite over a die situated in an explosive forming medium adapted to transmit to said composite the shock forces generated by the detonation of an explosive, explosively forming the composite to assume the curvature of said die, removing the composite from the said medium and die, removing the other said face plate, removing said solid material, and bonding the other said face plate to said core.

2. A method according to claim 1, wherein the flat honeycomb composite is of greater lateral size than the face area of the shaping die so that portions thereof extend outside of the die after shaping, and wherein the resulting shaped composite is trimmed to give the resulting curved honeycomb sandwich the shape of the die and the required dimensions.

3. A method according to claim 2, wherein the shaping die is of dome shape and the shaped honeycomb composite is trimmed to form a dome-shaped honeycomb sandwich.

4. A method according to claim 3 wherein the core and the face plate are of metal, whereby the core materials and the face plates are hardened and strengthened by the heat and pressure of the explosive forming.

5. The method of simultaneously forming honeycomb material and at least one metal face plate therefor into curved shapes which comprises: filling the spaces of the honeycomb material with removable solid compressible supporting material; placing the honeycomb material with one side of said face plate adjacent one face thereof on a female die having a concavity conforming to the required shape, said die being situated within an explosive forming medium adapted to transmit to said face plate and honeycomb material the shock forces generated by an explosive; detonating an explosive within said medium, thereby impressing a shock wave against the other side of said material to form it and said face plate into the die cavity; removing said formed honeycomb material and metal face plate from said medium; and removing said solid supporting material from said honeycomb material.

6. The method of claim 5 in which the forming is conducted in a liquid medium.

7. The method of claim 5 in which a face plate is positioned adjacent each side of said honeycomb material.

8. The method of simultaneously forming honeycomb material and at least two metal face plates therefor into curved shapes which comprises: attaching one face plate to one side of said honeycomb material; filling the cells of said honeycomb material with a removable compressible supporting substance; attaching the other of said metal face plates to the other side of said honeycomb material to form a sandwich; placing said sandwich over a cavity of the required shape in a female die, said sandwich and die being situated within an explosive forming medium for transmitting an explosive force; denoting an explosive adjacent the outer side of said sandwich to impress a shock wave thereon to form said sandwich to the shape of said cavity; removing said sandwich from said medium; removing at least one of said face plates from said honeycomb material; and removing said supporting substance from said honeycomb material.

9. A method for forming a multicelled honeycomb core structure into a curved shape comprising the steps of:
   filling the cells of said core structure with a removable, compressible supporting material;
   mounting said core structure and supporting material over a die, having a forming surface adapted to form said shape, situated in an explosive forming medium adapted to transmit to said core structure the shock wave forces generated by an explosive;
   explosively forming the core structure into said die situated to form said shape by detonating an explosive into said medium;
   removing said core structure and supporting material from said medium; and
   removing said supporting material from said core structure.

10. A method for forming a multicelled honeycomb core structure into a curved shape comprising the steps of:
    attaching at least one stabilizing plate to one side of said honeycomb core;
    filling the cells of said core with a removable, compressible supporting material;
    mounting the assembly of said core and stabilizing plate over a die, having a forming surface adapted to form said shape, situated in an explosive forming medium adapted to transmit to said assembly the shock forces generated by an explosive;
    explosively forming the assembly into said die situated to form said shape;
    removing the assembly from said medium; and
    removing said stabilizing plate and said supporting material.

11. A method according to claim 10 wherein said removable material is a nonreactive material of low melting point and wherein it is removed from the shaped core by melting it and allowing it to flow therefrom.

12. A method according to claim 11 wherein said removable material is paraffin which is introduced into said cells in liquid form and allowed to solidify to form the solid material.

13. A method for forming a curved honeycomb sandwich from a composite including a multicelled core member and a pair of face plates for attachment to the sides thereof, comprising the steps of:
    attaching at least one of said face plates to one side of said core member;

filling the cells of said core member with a removable, compressible supporting material;

mounting a second of said face plates upon the other side of said core member;

positioning the assembly of said core member and face plates over a die, having a forming surface adapted to form said core member, situated in an explosive forming medium adapted to transmit to said assembly the shock forces generated by the detonation of an explosive;

explosively forming the assembly into said die situated to form said assembly;

removing the assembly from said medium;

removing at least one of said face plates;

removing said supporting material;

bonding at least one of the formed face plates to the formed core member.

14. The method of claim 13 including the step of positioning at least one stabilizing plate adjacent at least one side of said assembly prior to positioning the assembly over said die.

References Cited by the Examiner
UNITED STATES PATENTS

| | | | |
|---|---|---|---|
| 2,703,297 | 3/55 | MacLeod | 29—552 X |
| 2,731,713 | 1/56 | Schaefer | 29—423 |
| 2,744,042 | 5/56 | Pace | 156—79 X |
| 2,988,809 | 6/61 | Hall | 29—423 |
| 3,065,720 | 11/62 | Rardin | 29—421 X |

WHITMORE A. WILTZ, *Primary Examiner.*

THOMAS H. EAGER, *Examiner.*